United States Patent [19]
Dullien

[11] Patent Number: 6,029,440
[45] Date of Patent: Feb. 29, 2000

[54] TURBULENT FLOW PRECIPITATOR FOR COMBUSTION IN DIESEL OR GASOLINE ENGINE EXHAUSTS

[75] Inventor: Francis A. L. Dullien, Kitchener, Canada

[73] Assignee: Institut Francais Du Petrole, Rueil-Malmaison, France

[21] Appl. No.: 08/913,761

[22] PCT Filed: Jan. 20, 1997

[86] PCT No.: PCT/FR97/00102

§ 371 Date: Sep. 22, 1997

§ 102(e) Date: Sep. 22, 1997

[87] PCT Pub. No.: WO97/27385

PCT Pub. Date: Jul. 31, 1997

[30] Foreign Application Priority Data

Jan. 22, 1996 [US] U.S. .................................... 60/010298

[51] Int. Cl.[7] ................................ F01N 3/00; F01N 3/10
[52] U.S. Cl. ................................ 60/274; 60/299; 55/259; 422/177
[58] Field of Search .............................. 60/274, 286, 297, 60/299, 311; 422/177, 181; 55/1, 257.2, 257.3, 259, 278, 308, 322, 326, 442

[56] References Cited

U.S. PATENT DOCUMENTS

| | | | |
|---|---|---|---|
| 4,292,050 | 9/1981 | Linhardt et al. | 55/1 |
| 4,407,785 | 10/1983 | Pfefferle | 422/177 |
| 5,240,470 | 8/1993 | Wright | 422/177 |
| 5,567,395 | 10/1996 | Okabe et al. | 422/180 |
| 5,658,536 | 8/1997 | Okabe et al. | 422/180 |
| 5,674,460 | 10/1997 | Plog et al. | 422/177 |
| 5,820,832 | 10/1998 | Huttenhofer et al. | 422/171 |
| 5,866,080 | 2/1999 | Day | 422/180 |

FOREIGN PATENT DOCUMENTS

| | | |
|---|---|---|
| 434539 | 6/1991 | France . |
| 2264655 | 9/1993 | United Kingdom . |

*Primary Examiner*—Andrew M. Dolinar
*Assistant Examiner*—Mahmoud M. Gimie
*Attorney, Agent, or Firm*—Antonelli, Terry, Stout & Kraus, LLP

[57] ABSTRACT

The invention relates to an apparatus for collecting internal combustion engine exhaust emission particulates comprising at least one channel (1), preferably several parallel unobstructed flow channels, of about 3 mm to 30 mm diameter, and a length of about 10 cm to 100 cm, said channel being surrounded on all sides by spaces, recesses or pockets (2) of about 1 mm width which are about 5 mm deep in a direction perpendicular to the axis of the channel, said channels being such that the exhaust gases flow at a velocity of about 5 m/s to 50 m/s. The invention further relates to the associated process.

15 Claims, 4 Drawing Sheets

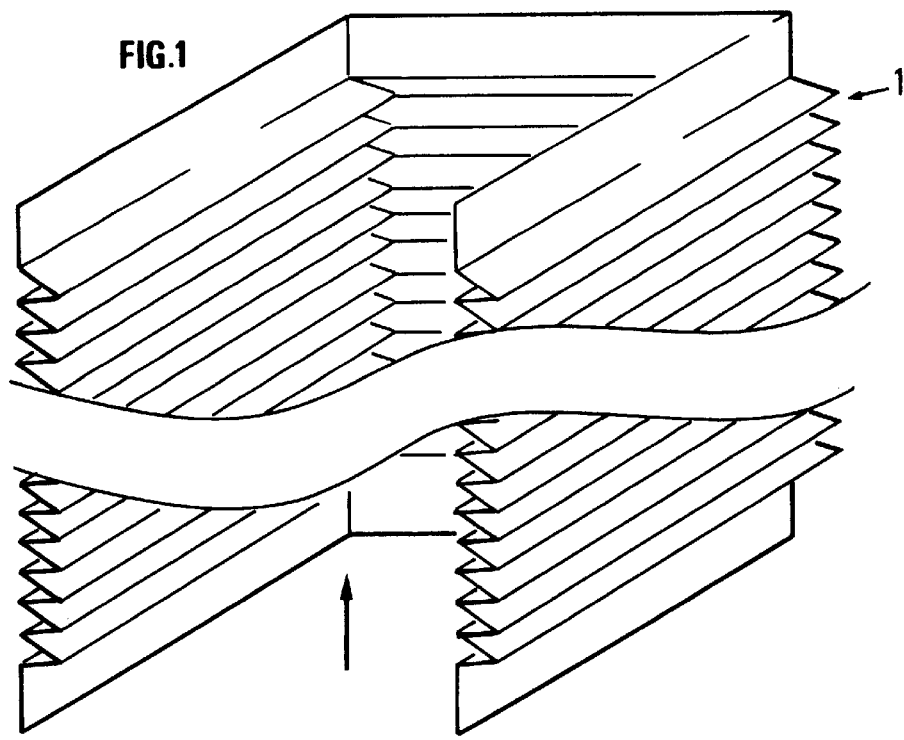
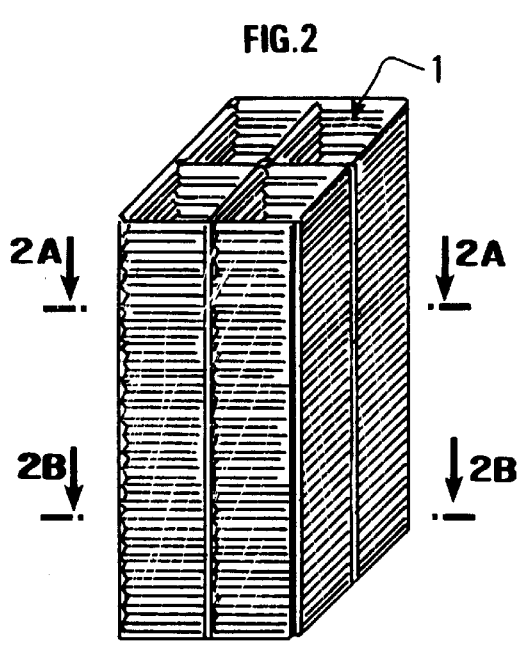
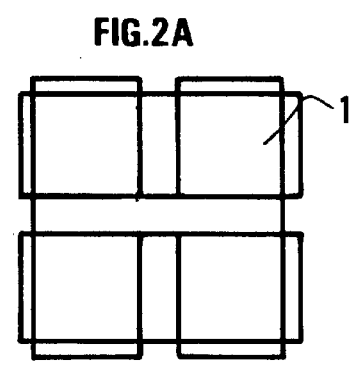
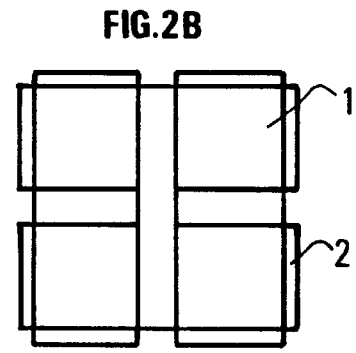

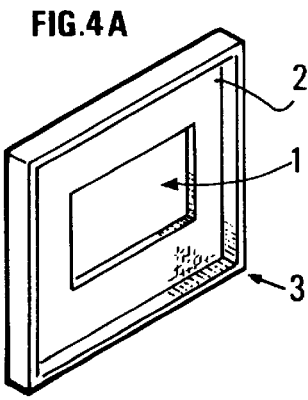
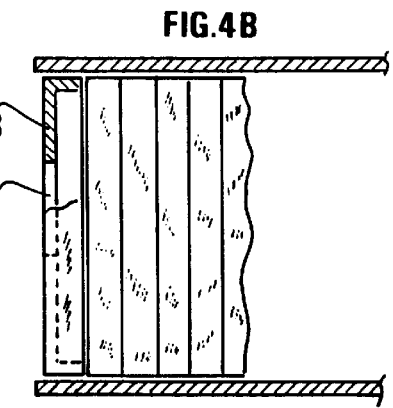
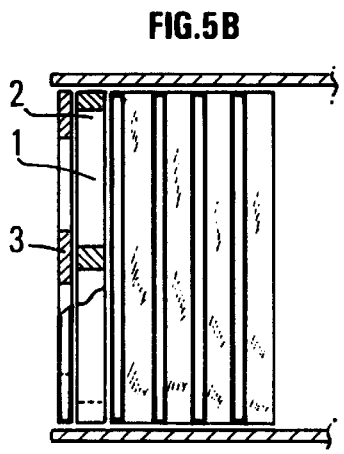
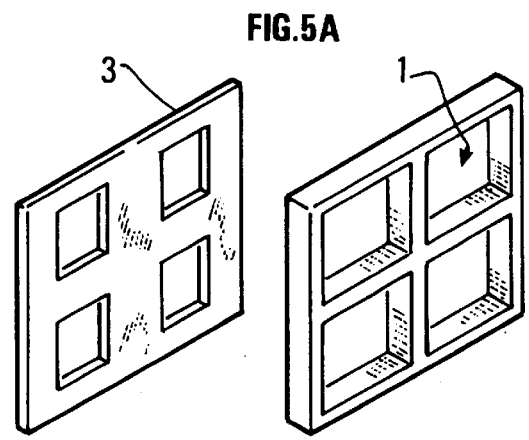
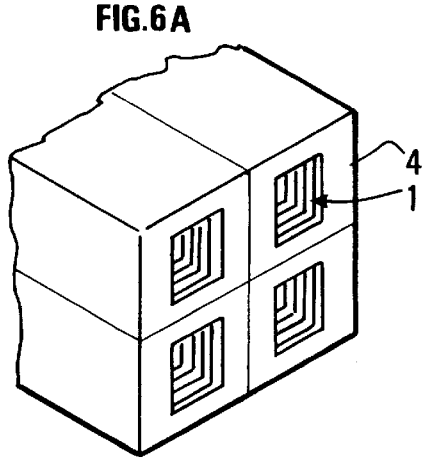
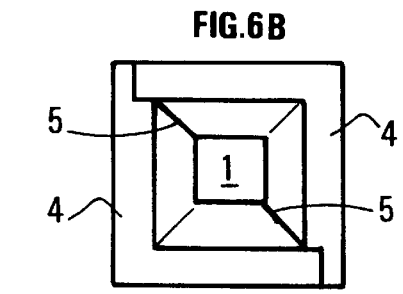
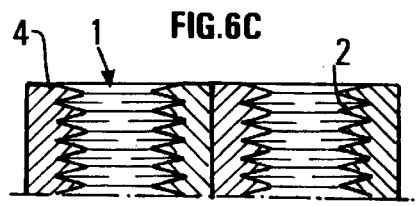

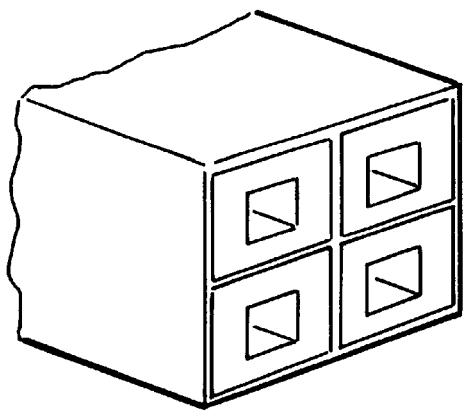
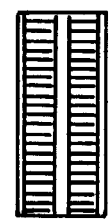
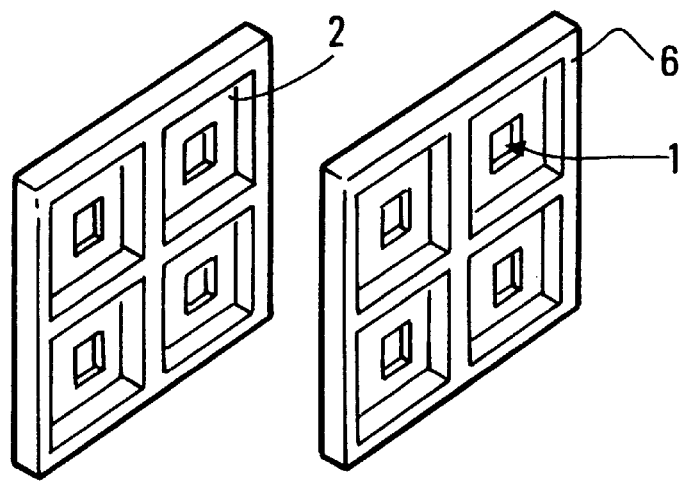
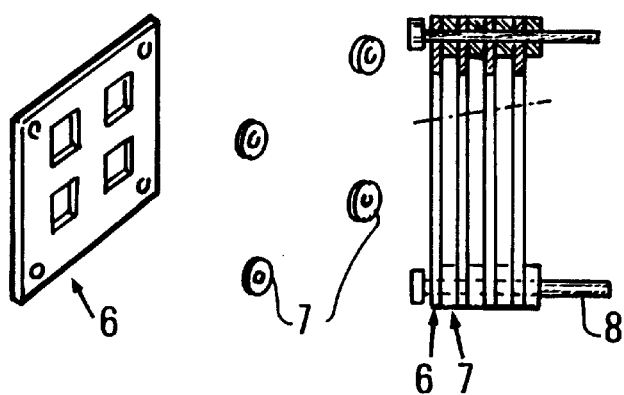

TURBULENT FLOW PRECIPITATOR FOR COMBUSTION IN DIESEL OR GASOLINE ENGINE EXHAUSTS

BACKGROUND OF THE INVENTION

The Turbulent Flow Precipitator principle consists of passing a fluid in turbulent flow in a channel past a large number of narrow and deep spaces at least partially bounded by solid surfaces, which are positioned alongside of the channel and communicate freely with the fluid flowing there. Fine particulates suspended in the fluid follow the turbulent velocity fluctuations and are carried thereby into said narrow and deep spaces, where the turbulence dies out and where the particles deposit on the solid surfaces by inertial impaction, interception or Brownian diffusion. UK Patent No. GB 2 264 655B discloses such a principle.

SUMMARY OF THE INVENTION

In the existing patent, the Turbulent flow Precipitator (TFP) principle has been described particularly with reference to the collection of fine particles from gas streams. The present invention is concerned with more specific details for one specific application of the TFP principle, for trapping and subsequently oxidising particulate pollutants present in exhaust gases from internal combustion engines, such as diesel or gasoline engines. Trapped pollutants may be oxidised naturally by exhaust heat or by application of burners or heaters, including electric heaters. The temperature required for oxidation may be decreased by the application of suitable fuel additives or by a suitable catalyst deposited on the collector surfaces or otherwise.

For the purpose of trapping internal combustion engine exhaust emissions of motor vehicles, the TFP must satisfy some special requirements. It must be able to collect and trap ultrafine soot particles which are in the size range of less than 0.5 micrometers, with a good efficiency (at least 70%), it must be of compact size, comparable with the dimensions of a typical muffler, it must treat relatively large gas flows, typically in the range of about 50 L/s to about 500 L/s, it must operate with relatively low pressure losses to avoid the adverse effects on engine performance, fuel consumption and, therefore, pollutant emissions; and it must be regenerable conveniently while in place in the vehicle, without requiring stopping either the engine or the vehicle. In the case of stationary sources, there are no stringent limitations of permissible TFP size.

A number of possible TFP designs, meeting with the above requirements, have been prepared. All designs have the following features in common. They consist of a channel, or several parallel channels, of a diameter typically in the range of about 5 mm to about 30 mm, although other dimensions are possible. Each channel is surrounded by a large number of spaces, or recesses, which are deep in the direction perpendicular to, and narrow in the direction parallel to, the duct axis. These spaces may, or may not, connect channels lying alongside of each other. Any connections between channels lying alongside of each other must be small enough to permit no cross-flow between flow channels; The exhaust gases flow in the channel(s), typically in the range of from about 5 m/s up to about 50 m/s velocity, although other velocities are possible, in a turbulent state, whereas turbulent velocity fluctuations carry the particulate emission into the spaces surrounding the channel(s) where it deposits on the walls constituting the spaces. The spaces constitute the traps for the particulate emissions, whereas the channel(s) remain(s) unobstructed and permit(s) unhindered exhaust gas flow. Lower operating temperatures result in higher collection efficiencies and are, therefore, to be preferred to high operating temperature of the TFP. The TFP may be constructed of suitable metals, capable of resisting high temperatures, such as 310 stainless steel, or ceramics.

In other words the present invention consists of an apparatus for collecting internal combustion engine exhaust emission particulates comprising at least one channel, preferably several parallel unobstructed flow channels, of about 3 mm to 30 mm diameter, and a length of about 10 cm to 100 cm, said channel being surrounded on all sides by spaces, recesses or pockets of about 1 mm width which are about 5 mm deep in a direction perpendicular to the axis of the channel, said channels being such that the exhaust gases flow at a velocity of about 5 m/s to 50 m/s.

The apparatus according to the invention further comprises means for oxidizing particulates deposited on walls of said spaces, recesses or pockets, said means comprising a suitable catalyst deposited on the channel walls or fuel additives or burners or electrical heaters.

More precisely, said channels may have angular such as square, or rounded such as circular, cross sections.

Furthermore, said spaces, recesses or pockets may extend uninterrupted over the entire circumference of said flow channel, resulting either in a channel of a shape like bellows or in one resembling the channel that would be formed by a succession of closely spaced orifice plates placed in a duct.

According to another embodiment, said spaces, recesses or pockets may consist of tubes or capillaries with their axes perpendicular to the general axis of the flow channel.

Moreover, said spaces recesses or pockets and said flow channels are arranged such that said spaces, recesses or pockets do not connect neighbouring flow channels.

Another arrangement is such that the degree of connection is small enough to prevent cross-flow between said channels via said spaces. recesses or pockets.

The invention also consists of a method for collecting internal combustion engine exhaust emission particulates consisting of flowing said exhaust gases through at least one channel but preferably several parallel unobstructed flow channels of about 3 mm to 30 mm diameter, and a length of about 10 cm to 100 cm, said channel being surrounded on all sides by spaces, recesses or pockets of about 1 mm width which are about 5 mm deep in a direction perpendicular to the axis of the channel, said exhaust gases flowing therein with a velocity of about 5 m/s to about 50 m/s, such that the particulates deposit on the walls of said spaces, recesses or pockets and do not obstruct the cross section of said flow channels.

Said method consists of oxidizing the particulates deposited on walls of said spaces, recesses or pockets, by means of either a suitable catalyst deposited on said channel walls or by using suitable fuel additives, burners, or removed by other means.

The following are two sample calculations, A and B, illustrating the potential of a TFP, based on 50 m/s exhaust gas velocity and 45 kW output. suitable for small passenger cars.

| A. | | | |
|---|---|---|---|
| Length of Duct mm | 200 | Channel Spacing | 5 |
| Open Duct Size mm | 5 | TFP Area cm² | 72,25 |

-continued

| | | | |
|---|---|---|---|
| Collection Efficiency | 0,7 | Free Flow Area cm² | 16 |
| Total Flowrate I/s | 80 | Wall Area cm² | 56,25 |
| No. Parallel paths | 64 | TFP Volume cm³ | 1445 |
| Gas Velocity m/s | 50,00 | Wall Volume cm³ | 1125 |
| Pressure Drop psi | 0,91 | Free Wall Volume cm³ | 787,50 |
| Soot load for 10% loaded trap (soot density 0.3 gm/cm³) gm | | | 23,63 |
| Average hours to 10% soot loading hr | | | 4,38 |

B.

| | | | |
|---|---|---|---|
| Length of Duct mm | 1000 | Channel Spacing | 5 |
| Open Duct Size mm | 30 | TFP Area cm² | 29,70 |
| Collection Efficiency | 0,7 | Free Flow Area cm² | 18 |
| Total Flowrage I/s | 80 | Wall Area cm² | 11,70 |
| No. Parallel paths | 2 | TFP Volume cm³ | 2959,9747 |
| Gas Velocity m/s | 44,44 | Wall Volume cm³ | 1169,9747 |
| Pression Drop psi | 0,60 | Free Wall Volume cm³ | 818,98 |
| Soot load for 10% loaded trap (soot density 0,3 gm/cm³) gm | | | 24,57 |
| Average hours to 10% soot loading hr | | | 4,55 |

BRIEF DESCRIPTION OF THE DRAWINGS

FIG. 1 is a perspective view, with parts cut away for clarity, of a turbulent flow precipitator in accordance with one embodiment of the invention;

FIGS. 2, 2A and 2B contains respectively a perspective view and two sectional views of a turbulent flow precipitator in accordance with another embodiment of the invention;

FIGS. 4A and 4B respectively contains a longitudinal section through a duct provided in accordance with an additional embodiment of the invention and an exploded view of a plate;

FIG. 5 contains a longitudinal section (FIG. 5B) through a duct provided in accordance with a further embodiment of the invention as well as an exploded view (FIG. 5A) of some of the plates;

FIG. 6 contains longitudinal sections (FIG. 6B; FIG. 6C) through a duct provided in accordance with a further embodiment of the invention as well as a perspective view (FIG. 6A) of part of the duct;

FIG. 7 contains a longitudinal section (FIG. 7B) through a duct provided in accordance with a further embodiment of the invention as well as a perspective view (FIG. 7A) of part of the duct; and FIG. 8A contains a perspective view of individual plates and their assembly in a stack provided in accordance with an additional embodiment of the invention.

FIG. 8B contains in section and in split another embodiment of the invention.

DETAILED DESCRIPTION OF THE INVENTION

Figure 2C:
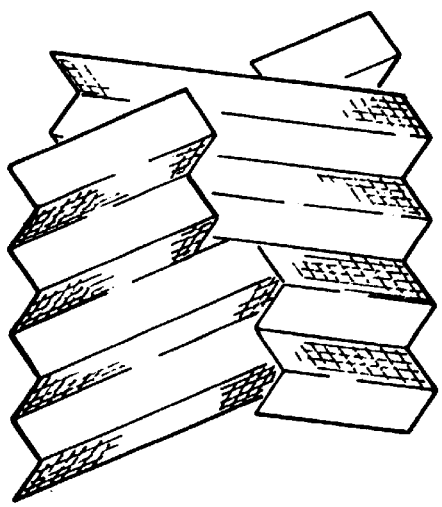
FIG. 2C is a perspective view of the intersection of two orthogonal pleated sheets employed in the structure of FIG. 2A.

Referring to the drawings, in FIG. 1, a single channel (1) with pleated walls is shown. The pleats may have triangular (as shown) or different (such as, e.g., rectangular) profiles. Pleat heights may range from about 4 mm to about 40 mm, and the pleat pitch from about 1 mm to 10 mm. although other dimensions are possible. The ratio of pleat height to pleat pitch ranges from about 1 to about 8. The pleats constitute the traps for the collection of particulate emissions.

In FIG. 2A, a honeycomb structure consisting of four pleated wall channels is shown. Two sections (AA and BB) across the structure are also shown:

Section AA (FIG. 2A) is in the top half whereas section BB (FIG. 2B) is in the bottom half of said pleated wall channels. Owing to the method of construction, the walls dividing the unit into said four compartments intersect differently in the top half (section AA) than in the bottom half (section BB).

The constructional principle of making a honeycomb of pleated-wall channels is shown in FIG. 2C. Each intersecting pleated plate is provided with a cutout, or slot, the width of each is equal to the pleat height and which terminates halfway down each plate.

Figure 3A:
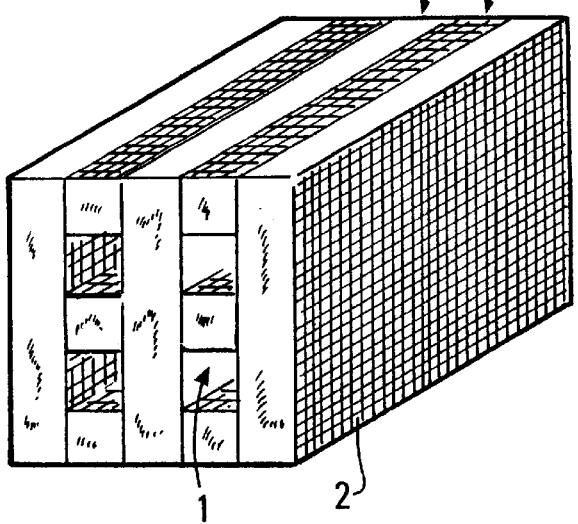
FIGS. 3A to 3C are various views of the construction of a turbulent flow precipitator in accordance with a further embodiment of the invention.
Figure 3B:
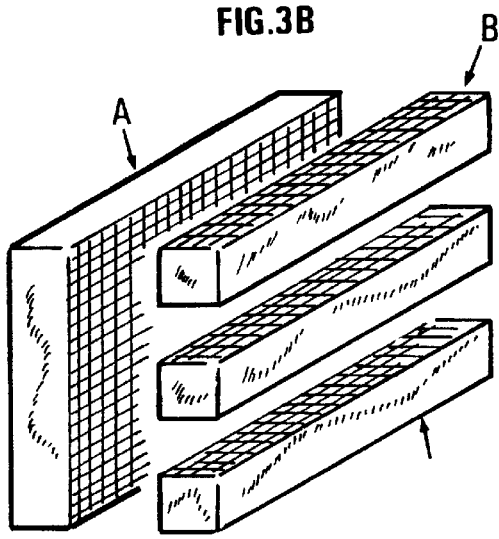

In FIG. 3A, a TFP constructed from a conventional ceramic honeycomb monolith, used to make catalytic converters for automobiles is shown. The original monolith, consists of about 1 mm diameter capillaries and is shown schematically in FIG. 3B. The monolith of FIG. 3B is cut into slices A and some of these slices are cut further into strips B, as shown in FIG. 3B. Then both slices A and strips B are in reassembled, using a suitable high temperature cement to form a final TFP. Thus open channels 1 of typically about 5 to about 10 mm diameter, with surrounding capillaries 2. is formed as shown in FIG. 3C. The exhaust gases flow in the unobstructed channels 1 of about 5 to about 10 mm diameter, although other diameters are possible, whereas the particulate emissions deposit on the about 1 mm diameter capillaries 2, where they are carried by turbulent velocity fluctuations.

Figure 3D:
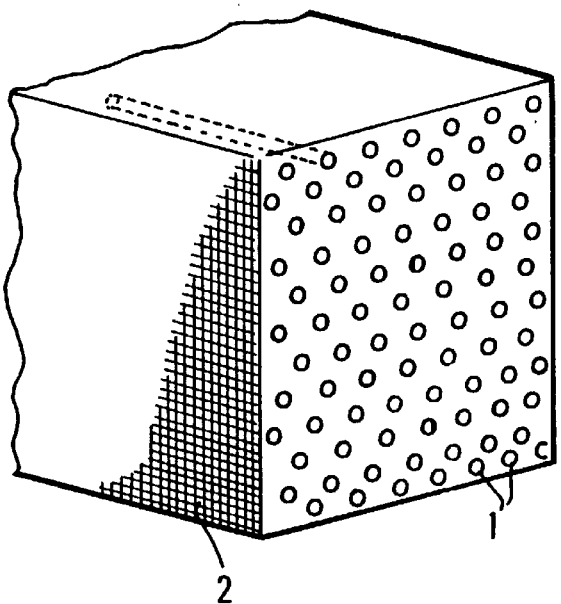
FIGS. 3D and 3E respectively show a perspective and a sectional view of another embodiment of the invention.
Figure 3C:
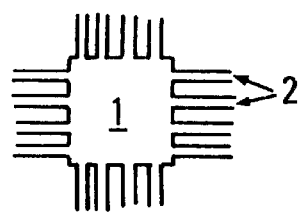
Figure 3E:
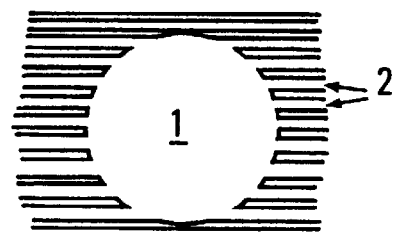

An alternate way to use a conventional ceramic honeycomb to make a TFP is shown in FIG. 3D. Here flow channels 1 have been punched out from the honeycomb.

In FIGS. 4A and 4B a single channel TFP constructed from pressed or folded plates 3 or ceramics is shown. The plates 3, as shown in FIG. 4A are compressed together by tension in the duct, transmitted through the end housing. The plates may be sealed to the duct by refractory paste or welding, say, every tenth plate to the duct. The duct and channels 1 are shown in a square configuration with their pockets 2, but many shapes are possible. The folded edges show continuous small raised areas for possible separation.

In FIGS. 5A and 5B, a four channel TFP constructed from punched plates 3 or ceramics is shown. The plates may be compressed together by tension in the duct, transmitted by the end housing. The plates could be sealed to the duct by refractory paste or welding, say, every tenth plate to the duct. Four channels 1 are shown, with their pockets 2, but one to many channels 1 are possible. The duct and channels are shown in a square configuration, although many shapes are possible.

FIGS. 6A, B and C disclose a four channel TFP cast in metal or ceramics. FIG. 6A is a perspective view; FIG. 6B is a cross-section; FIG. 6C is a longitudinal section. This structure may be housed in a metal outer housing and may be cast in sections longitudinally or otherwise sections may be held together by compression. The sections may be sealed to the housing by refractory cement. Four channels are shown, one to many are possible. The block and channels are shown in a square format, many shapes are possible. One possible cross section through a single flow channel is shown. The channel is split longitudinally as indicated by the dark line, and is cast in two identical halves. Any number of flow channels are possible by stacking the above end housing in a suitable pressure housing. It may be cast in short lengths and slotted together with a suitable interlocking arrangement.

The flow channel is cast in two halves. The solid line 5 running (roughly) diagonally across the diagram represents the boundary where the halves are joined together. Each half, if viewed separately, is a single molded piece consisting of a straight supporting element, similar to an angle iron, on the inside face of which there are a multitude of closely spaced "teeth" of the shape shown in the diagram. FIG. 6C, the longitudinal section, shows two channels (1), separated and surrounded by solid walls 4, equipped with "teeth". Indeed, the two channels in the longitudinal section 6C look like two bellows. This embodiment is basically merely a different method of construction of the geometry of the embodiment shown in FIGS. 1 and 2.

In FIGS. 7A and 7B, a four channel TFP is shown, made of metal or ceramic mesh, mat or sponge, all housed in a metal outer housing. The shaded area indicates the mesh, mat or sponge. A honeycomb structure could be used. Four channels are shown, of a square configuration; one to many channels of many shapes are possible. A cross section through a possible honeycomb structure is shown in FIG. 7B, with a center divider. Intersections at dividing walls can be jointed in many ways to achieve the required strength. An open sponge structure could also be used.

In FIG. 8A, a four channel TFP constructed from plates 6, separated by washers 7 is shown. Compression rods 8, extending longitudinally, assemble said elements 6, 7.

FIG. 8B shows a TFP constructed from a stack of ceramic plates 6 with raised sections on the plates as spacers. In other words, void is formed in a face of a plate, by large recess in the depth of said plate.

What is claimed is:

1. Apparatus for collecting internal combustion engine exhaust emission particulates comprising at least one channel of about 3 mm to 30 mm diameter, and a length of about 10 cm to 100 cm, said at least one channel being surrounded on all sides by spaces, recesses or pockets of about 1 mm width which are about 5 mm deep in a direction perpendicular to the axis of the channel, said at least one channel being such that the exhaust gases flow at a velocity of about 5 m/s to 55 m/s.

2. Apparatus according to claim 1 further comprising oridizing means for oxidizing particulates deposited on walls of said spaces, recesses or pockets.

3. Apparatus according to claim 1, wherein said apparatus is constructed from metal or ceramic capable of resisting high temperatures.

4. Apparatus according to claim 1, wherein said at least one channel has an angular cross section.

5. Apparatus according to claim 1, wherein said spaces, recesses or pockets extend uninterrupted over the entire circumference of said at least one channel, resulting either in a channel of a shape like bellows or in one resembling the channel that would be formed by a succession of closely spaced orifice plates placed in a duct.

6. Apparatus according to claim 1, wherein said spaces, recesses or pockets comprise tubes or capillaries with their axes perpendicular to the general axis of the flow channel.

7. Apparatus according to claim 1, wherein a plurality of channels are provided and wherein said spaces, recesses or pockets and said channels are arranged such that said spaces, recesses or pockets do not connect neighbouring channels.

8. Apparatus according to claim 1, wherein a plurality of channels are provided and wherein said spaces, recesses or pockets and said channels are arranged such that the degree of connection is small enough to prevent cross-flow between said channels via said spaces, recesses or pockets.

9. Apparatus according to claim 1, wherein said at least one channel has a rounded cross section.

10. Apparatus according to claim 2, wherein said oxidizing means comprise a catalyst deposited on walls of said at least one channel.

11. Apparatus according to claim 2, wherein said oxidizing means comprise fuel additives.

12. Apparatus according to claim 2, wherein said oxidizing means comprise burners.

13. Apparatus according to claim 2, wherein said oxidizing means comprise electrical heaters.

14. Method for collecting internal combustion engine exhaust emission particulates consisting of flowing said exhaust gases through at least one channel of about 3 mm to 30 mm diameter, and a length of about 10 cm to 100 cm, said at least one channel being surrounded on all sides by spaces, recesses or pockets of about 1 mm width which are about 5 mm deep in a direction perpendicular to the axis of the channel, said exhaust gases flowing therein with a velocity of about 5 m/s to about 50 m/s, such that the particulates deposit on the walls of said spaces, recesses or pockets and do not obstruct the cross section of said flow channels.

15. Method as claimed in claim 14, further comprising oxidizing the particulates deposited on walls of said spaces, recesses or pockets.

\* \* \* \* \*